United States Patent Office 3,264,480
Patented August 2, 1966

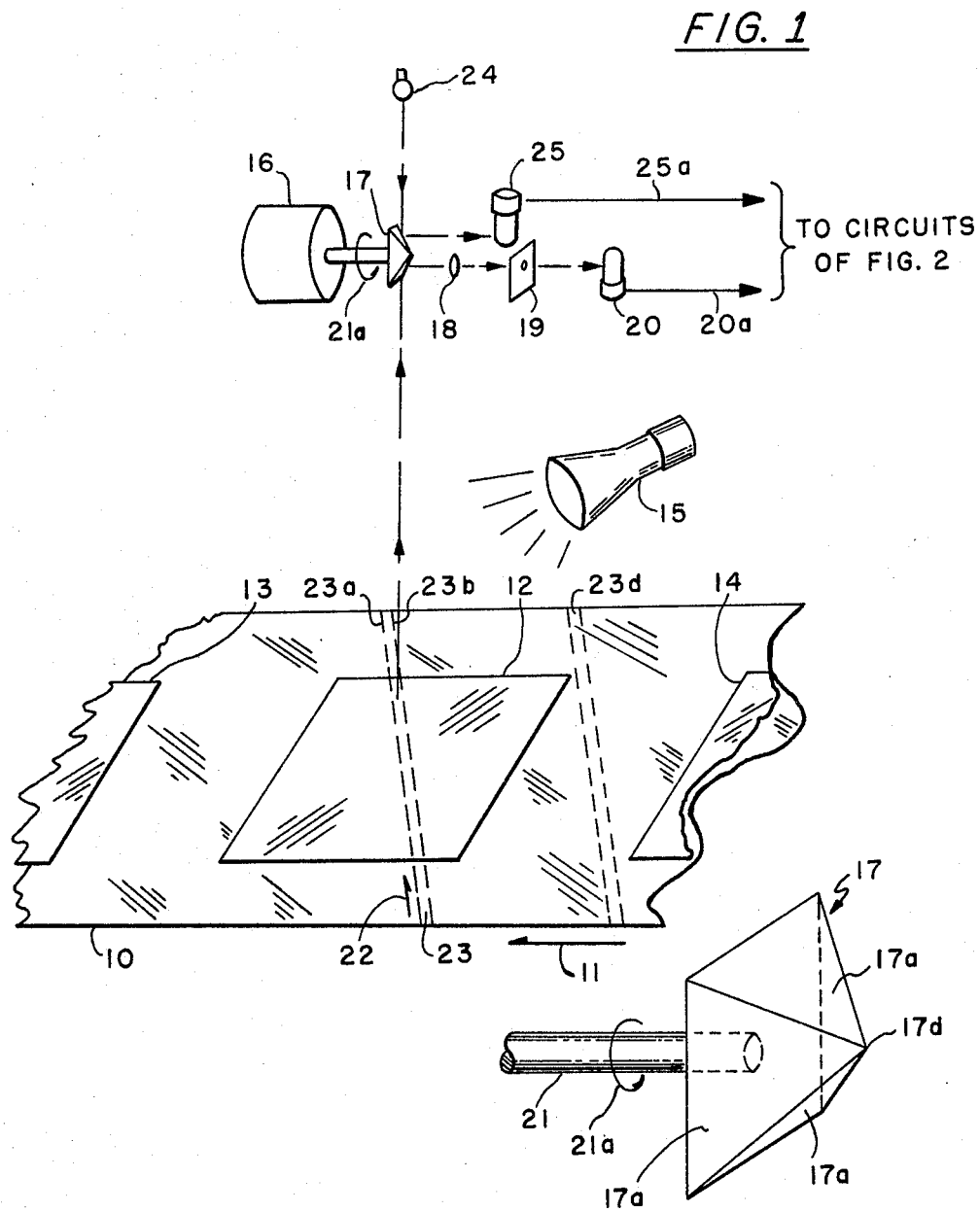

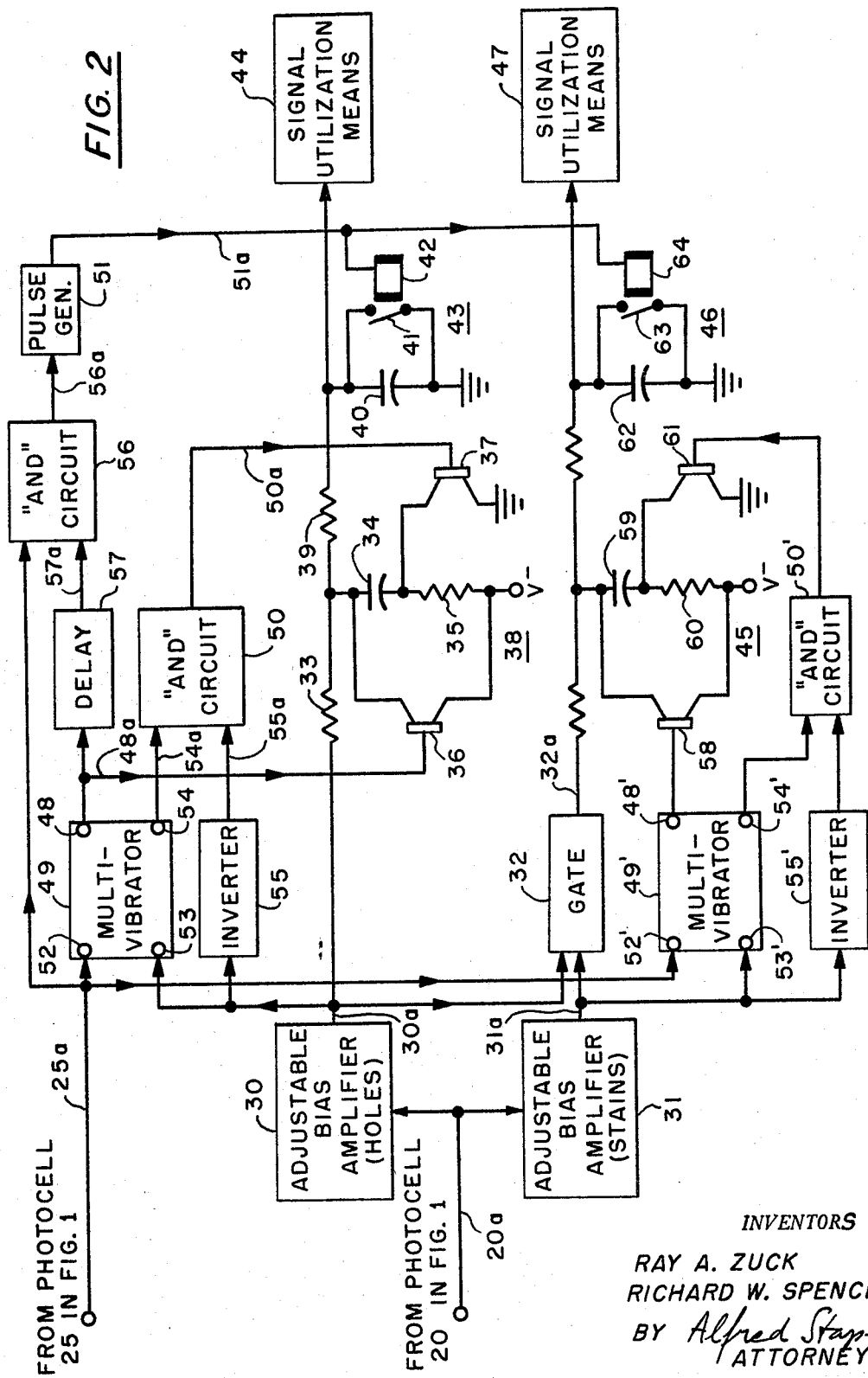

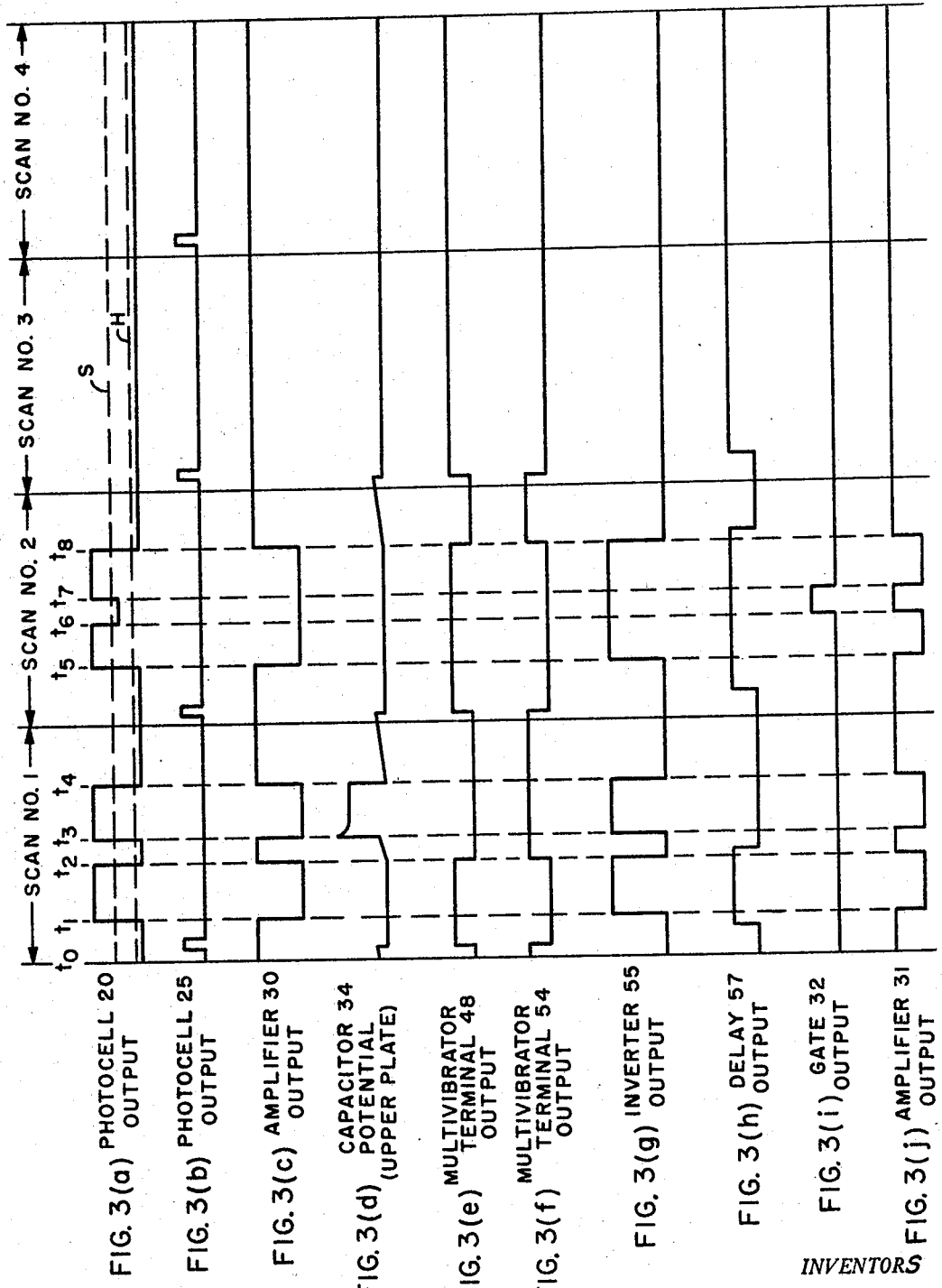

3,264,480
PHOTOELECTRIC INSPECTION APPARATUS FOR MATERIAL HAVING VARIATIONS IN REFLECTIVITY
Ray A. Zuck, Lafayette Hill, and Richard W. Spencer, Wayne, Pa., assignors, by mesne assignments, to Linen Supply Association of America, Chicago, Ill., a corporation of Illinois
Filed Jan. 15, 1962, Ser. No. 166,262
20 Claims. (Cl. 250—223)

This invention relates to equipment for the automatic inspection of material and more particularly to apparatus for the automatic inspection of sheet material whose surface is subject to undesired variations in light reflectivity.

Although not limited thereto, the invention is particularly applicable to the inspection of flat pieces of linen, such as towels, napkins, table cloths, and the like, and will therefore be discussed in relation to such material.

In the large scale commercial laundering of such linen there has been an urgent need for apparatus which is capable of inspecting the linen issuing from the laundering equipment to determine whether each individual piece is really clean and in good physical condition, or whether it has any stains or holes. If stains or holes do exist, then it is important to measure the total area covered by each of these types of defects in the piece of linen containing them since this determines its acceptability.

Although many forms of equipment for the automatic inspection of materials have been proposed in the past, the requirements to be met in the type of application mentioned above are so severe that none of the prior forms of apparatus have proven capable of meeting them. Consequently the inspection in question has, until the advent of the present invention, been carried out by human beings, leaving much to be desired in terms of reliability, economy and efficiency.

In particular, no practical inspection apparatus was known which was capable of providing the desired separate identification and measurement of the size of both stains and holes, in discrete pieces of material of widely varying lengths and widths.

Accordingly, it is a primary object of the invention to provide improved equipment for the automatic inspection of material.

It is another object to provide improved equipment capable of inspecting automatically a series of discrete pieces of material.

It is another object to provide improved equipment capable of inspecting automatically a series of discrete pieces of material of different lengths and widths.

It is another object to provide apparatus capable of determining automatically the total area of stains and/or holes in each of a plurality of individual pieces of material.

It is another object to provide apparatus capable of determining automatically the size of stains in each of a plurality of individual pieces of material and of determining separately, and also automatically, the size of holes in each of said pieces.

In achieving the foregoing objects, as well as others which will appear, reliance is placed on the fact that clean linen, without holes, has a higher light reflectivity than stains in the linen, which in turn, have a higher light reflectivity than holes in the linen.

In accordance with the invention, there is provided a photoelectric scanning mechanism which scans repeatedly elemental areas lying along a predetermined path. The pieces of linen to be inspected are transported across this scanning path, one after the other, while resting on a transport, such as a conveyor belt, having a light reflectivity at least as low as, and preferably lower than the darkest stain encountered in the linen.

The scanning mechanism produces two electrical signals, one of which represents the light reflectivity of the successively scanned elemental areas, while the other is a timing signal produced once per scan and independent of light reflectivity.

The reflectivity representative signal is supplied to two signal channels, each of which includes an electrical charge storage means. The storage means in one channel accumulates, during scanning of any given piece of linen, a total charge corresponding to the total area of holes in this piece. The storage means in the other channel concurrently accumulates a total charge corresponding to the total area of those stains in the same piece whose darkness exceeds a given value.

The timing signal is utilized to prevent the accumulation of charge from portions of the scanning path other than those in which either stains or holes are present.

Means are provided for utilizing the charges stored, as described above, to determine the disposition of the piece of linen whose scanning has caused them to be accumulated.

For further details reference is made to the following description and accompanying drawings in which:

FIGURE 1 illustrates diagrammatically a preferred embodiment of the scanning mechanism forming part of the invention;

FIGURE 1a is a fragmentary view, in perspective, of the rotating mirror mechanism of the apparatus of FIGURE 1;

FIGURE 2 illustrates, partly in block diagram and partly in schematic form, a preferred embodiment of circuitry for processing in accordance with the invention the signals produced by the scanning mechanism of FIGURE 1; and FIGURES 3(a) through 3(j) are a set of waveform diagrams all drawn to a common time scale and illustrating the electrical signals present at various points in the apparatus of FIGURES 1 and 2.

Referring to FIGURE 1, there is shown a fragment of a conveyor belt 10, which is preferably made of a matte, black material. In operation this belt moves at substantially uniform velocity as hereinafter described in the direction of arrow 11, i.e. from right to left in the figure. The pieces of linen, or other material, to be inspected are spread out on this belt, spaced from each other in the direction of the belt motion. For convenience, the pieces are hereafter referred to as linen. A typical linen piece is shown at 12 and fragments of the pieces which precede and follow it are shown at 13 and 14, respectively.

Mounted above belt 10 is a conventional source of illumination illustrated diagrammatically by lamp 15, and a scanning and sensing mechanism comprising motor 16 (rotating at substantially uniform speed) four-sided pyramidal mirror 17, lens 18, aperture plate 19, and photocell 20.

The mirror 17, shown in greater detail in FIGURE 1a, has four pyramidal flat sides 17a and a back side not shown, which converge at apex 17d. The sides 17a are silvered to reflect substantially all incident light. Each has substantially a 45° angle in relation to the axis of the shaft 21.

In operation motor 16 rotates mirror 17 in the direction indicated by arrow 21a. Belt 10, lamp 15 and the components of the scanning and sensing mechanism are so positioned in relation to each other that, during the major part of each quarter-turn of mirror 17, there is projected onto the photosensitive surface of photocell 20 light emanating from lamp 15 and reflected toward mirror 17 from successive elemental areas of belt 10 which sweep out on that belt, in the direction of arrow 22, a path 23 bounded by parallel broken lines 23a and 23b. The light is reflected by a face 17a of mirror 17 to the lens 18, aperture 19 and photocell 20. During the remainder of each quarter-turn of mirror 17, light is reflected to photocell 20 from areas off the edge of belt 10. The scanning path 23, whose width is determined primarily by the optical characteristics of lens 18 and the size of the aperture in plate 19, is preferably made about one-eighth inch wide. During successive quarter-turns of mirror 17, successive sweeps of the scanning path 23 take place. Preferably the rate of rotation of mirror 17 is sufficiently rapid in relation to the velocity of the belt 10 that successive scans are spaced by no more than the width of any one scan, namely the distance between 23a and 23b. The interrelation of the rotation of the mirror and the velocity of the belt is such that successive scans will cover adjacent areas of the belt—and of any linen piece transported upon the belt. It should be observed that the relation of the width of the scan path and the deviation of the crosswise scan from a line normal to the conveyor travel is such that at least one scan will be realized between pieces of linen, as shown by 23d, FIGURE 1. A light tight enclosure (not shown) painted black on the inside preferably is provided for the scanning mechanism described above. This enclosure has an aperture so positioned that only light from scanning area 23 can reach photocell 20, while light from all other areas of belt 10 and surrounding areas is excluded. Thus during that portion of each quarter turn of mirror 17 during which the light reaching photocell 20 does not emanate from scanning path 23 on belt 10, the amount of light reaching said photocell will be essentially equal to that reaching it from portions of the belt which are not covered with linen. An auxiliary light source consisting, for example, of a conventional, low-power light bulb 24 is also provided. This bulb is placed in the enclosure in such a position as to illuminate a face of pyramidal mirror 17 other than that which is illuminated by light reflected from scanning path 23. A second photocell 25 is so located relative to mirror 17 and light bulb 24 as to receive a comparatively brief flash of reflected light from bulb 24 once during a portion of each quarter-turn of mirror 17 other than that during which light from scanning path 23 is being reflected to photocell 20.

Preferably the rotating mirror 17 rotates in a plane forming an acute angle with the direction of motion of belt 10 so that the scanning path 23 traverses this belt diagonally. That is, the axis of shaft 21 is in a plane parallel to the plane of belt 10 and is at a slight angle in relation to the direction 11 of belt movement. The purpose of this is to make sure that during scanning of the leading or trailing edge of a piece of linen each scan crosses this edge only once, even though the linen piece has an uneven or crooked edge or is placed on the belt with these edges not accurately perpendicular to the direction of motion.

Also successive linen pieces should be spaced from each other by a distance several times greater than the width of the scanning path 23. As will appear hereinafter this aids in identifying the passage of ends of pieces across the scanning path 23.

Photocells 20 and 25 may be of any conventional type capable of producing an output signal whose magnitude varies in accordance with the intensity of the light falling upon them. For photocell 20 this intensity depends upon the reflectivity of the elemental area being scanned, this reflectivity being lowest when the elemental area is on a portion of the belt not covered by linen, while being highest on a portion of belt covered with clean linen, and intermediate on a portion covered with stained linen. The output signal 20a from photocell 20 will therefore be a time-varying signal having one value during scanning of clean linen, another value during scanning of the bare belt, and intermediate values during scanning of stained linen. Between successive scans of the belt and any linen present thereon said signal 20a will have substantially the same value as during scanning of the bare belt, as previously explained.

FIGURE 3(a) shows the waveform of the photocell output signal 20a during four typical consecutive quarter-turns of mirror 17 in FIGURE 1.

During the first quarter turn, designated Scan #1 in FIGURE 3(a), the scanning path is assumed to traverse a portion of a piece of linen under inspection which is somewhat narrower than the belt and which, though unstained, has a hole near the center. As a result the photocell output signal 20a, which is at the level corresponding to minimum reflectivity at the time $t_0$ at which Scan #1 begins, rises to the level corresponding to maximum reflectivity at the time $t_1$ when the scanning path crosses the edge of the linen. The signal then drops back to the level of minimum reflectivity from $t_2$ to $t_3$, during scanning of the belt surface exposed by the hole, and thereafter is again at the maximum reflectivity level until $t_4$ when the scanning path leaves the edge of the linen.

During the second quarter-turn, designated Scan #2 in FIGURE 3(a), the scanning path is assumed to traverse a portion of a piece of linen similar to that traversed in Scan #1, but having a stain rather than a hole. The photocell output signal therefore rises to the maximum reflectivity level at time $t_5$ when the scanning path crosses the edge of the linen piece and drops back to the minimum reflectivity level at time $t_8$ when the scanning path leaves the linen piece. In addition the signal drops to an intermediate level at time $t_6$ and sustains this level until time $t_7$ during which time the stain having intermediate reflectivity is scanned.

During the third quarter-turn, designated Scan #3 in FIGURE 3(a), the scanning path is assumed to encounter no linen at all, the absence of linen continuing into and through the time period required for the fourth quarter-turn, designated as Scan #4. The successive scans indicating the absence of linen occur during the period between passage of successive pieces of linen across the scanning path. During these entire scans (i.e. Scans #3 and #4) the signal is at its minimum reflectivity level, as shown in FIGURE 3(a).

Photocell 25 produces an output signal 25a consisting of periodic short pulses, which occur between consecutive scans of path 23. This output signal is shown in FIGURE 3(b) for the four typical scans shown in FIGURE 3(a). As shown, each pulse slightly precedes the interception of the scan with the edge of the linen. This permits the unit to be conditioned for the signal from the linen.

The manner in which the signals shown in FIGURES 3(a) and 3(b) are utilized in accordance with the invention will now be described with reference to FIGURE 2.

The output signal 20a, FIGURE 3(a), from the photocell 20 of FIGURE 1 is supplied to each of two amplifiers 30 and 31, shown in FIGURE 2. Each of the amplifiers 30 and 31 is a conventional, high-gain amplifier which may employ regenerative feedback and provide two distinctly different output potentials. One occurs when the input signal is above a predetermined bias level. The other occurs when it is below that level. The bias level for amplifier 30 is adjusted in conventional manner so that its output signal 30a assumes its more positive value whenever its input signal 20a falls below a level slightly above that derived by photocell 20 from a portion of each scanning path in which no linen is present. This bias level is indicated by horizontal broken lines H in FIGURE 3(a).

The output signal 30a produced by amplifier 30 in response to the input signal 20a shown in FIGURE 3(a) is illustrated in FIGURE 3(c).

For amplifier 31 the bias level is adjusted so that the same output signal transitions take place as in amplifier 30 but an input signal level nearer to that produced by scanning across a clean piece of linen, e.g. at the level indicated by horizontal broken line S in FIGURE 3(a).

The output signal 31a produced by amplifier 31, as shown in FIGURE 3(j), therefore has the same shape as that produced by amplifier 30 as illustrated in FIGURE 3(c) and, in addition, it also has a positive excursion during the interval $t_6-t_7$. This additional excursion is indicated in FIGURE 3(j). A gating circuit 32 is supplied with the output signal 31a from amplifier 31 and with the output signal 30a from amplifier 30. This gating circuit is of any conventional form capable of utilizing positive excursions in the signal 30a from amplifier 30 to prevent contemporaneous positive excursions in signal 31a from amplifier 31 from reaching the output of the gating circuit. The output signal 30a produced by amplifier 30 has positive excursions only during portions of each scanning path in which no linen at all is present, while the output signal 32a produced by gating circuit 32 has positive excursions only during portions of each scanning path in which stained linen is present.

The manner in which these signals are used to provide the desired indications of the sizes of holes and stains in each linen piece under inspection will now be explained.

The output signal 30a from amplifier 30 is supplied via resistor 33 to one plate of capacitor 34, FIGURE 2, whose other plate is connected to a conventional source of negative bias potential V− via resistor 35.

The series combination of resistor 35 and capacitor 34 is shunted by the emitter-collector circuit of transistor 36, while resistor 35 alone is shunted to ground by the emitter-collector circuit of transistor 37. As will be explained hereinafter, elements 33 through 37 constitute an intermediate storage circuit 38 which responds to each positive excursion of the signal 30a from amplifier 30 due to the scanning of a hole and is effective to store a charge in capacitor 34 corresponding in magnitude to the duration of this excursion, and to transfer this charge via resistor 39 to another, preferably much larger, capacitor 40 immediately after the end of each such excursion.

The time constant of the charging circuit to capacitor 34 through resistor 33 is preferably sufficiently long to cause capacitor 34 to charge at a substantially uniform rate when a hole is scanned.

Capacitor 40 is shunted to ground by a relay switch 41, which is normally open and subject to closure in response to energization of the relay winding 42. As explained hereinafter, elements 39 through 42 constitute a final storage circuit 43 which operates to store in the capacitor 40 a charge corresponding to the sum of all separate hole-representative charges transferred to it from intermediate storage circuit 38 during scanning of an entire linen piece being inspected.

As hereinafter explained, relay 42 is actuated momentarily after the last scan over each piece of linen. This discharges the capacitor 40 to condition the same for successive charges from capacitor 34 as the next piece of linen is scanned.

The charge from the capacitor 34 is transferred in part to capacitor 40 immediately after each scan of a hole. As described hereafter, the transistor 37 is made conducting at this time, the capacitors 34 and 40 thereupon define a series closed circuit with resistance 39, and the total charge distributes itself between the capacitors. Preferably the capacitor 40 is of sufficient size to receive successive charges from capacitor 34 without itself reaching a charge (and hence voltage) that significantly reduces the increment of charge on capacitor 40 associated with the last scan across a particular piece of linen.

This storage of charge develops a potential across capacitor 40 whose magnitude corresponds to the amount of charge stored and therefore also to the total area of all the holes present in any given linen piece under inspection. This potential is applied to a signal utilization means 44 which may consist, for example, of an amplifier circuit actuating a relay whenever the potential on capacitor 40 exceeds a present level. By adjustment of this level the relay in question can be made to operate whenever the total hole area in a given piece of linen exceeds a predetermined value. Operation of the relay can be made to provide an indication enabling an operator to divert the piece of linen in question. Alternatively it can be made to operate a mecahnical diverter in any conventional manner. The details of this signal utilization means form no part of this invention and are therefore not described in further detail.

The charge stored on capacitor 40 is discharged by closure of switch 41 at the end of the passage of any given linen piece across scanning path 23 of FIGURE 1. The manner in which this switch is closed is described in detail hereinafter.

The output signals 32a from gating circuit 32 are supplied to a circuit 45 having the same circuitry as circuit 38 and performing the same intermediate storage function as the latter, but with respect to the positive excursions due to scanning of stains which excursions are effective to initiate the output signals 32a from gating circuit 32. The operation is the same as above described for the circuit 38. A final storage circuit 46, corresponding to final storage circuit 43, is connected to the intermediate storage circuit 45 for the purpose of accumulating a charge representing the total area of stains in any given piece. Finally a signal utilization means 47 is provided which corresponds to means 44 and responds to the potential applied thereto from storage circuit 46 to provide an indication of each piece of linen having a total stained area in excess of a predetermined amount.

The operation of the signal channel comprising intermediate storage circuit 38 and final storage circuit 43 will now be explained.

The potential developed at the upper plate of capacitor 34 during the four typical scans under consideration is illustrated in FIGURE 3(d). At the beginning of Scan #1 (time $t_0$) this potential is rising due to the fact that the output from amplifier 30 is positive at that time. At the time of occurrence in this scan of the auxiliary timing pulse 25a, FIGURE 3(b), normally nonconducting transistor 36 is rendered conductive by application of a suitable pulse 48a to its base. This discharges capacitor 34 and establishes the potential at its upper plate at V−. The pulse 48a which renders transistor 36 conductive is derived from output terminal 48 of multivibrator 49 in FIGURE 2 in a manner discussed in detail hereinafter. This pulse, which prevents the potential of the upper plate of capacitor 34 from departing from V−, ends at time $t_2$ when the output signal 30a from amplifier 30 again goes positive due to scanning across a hole in the piece of linen being inspected. During this positive-going output signal, which lasts from time $t_2$ to time $t_3$ in FIGURE 3(c), the potential on the upper plate of capacitor 34 raises progressively to a terminal value determined by the duration of said pulse, and therefore also by the width of the hole being scanned. At time $t_3$, when said positive signal 30a ends, a pulse 50a is supplied to the base of transistor 37 from "AND" circuit 50 which renders this normally nonconducting transistor conductive. This raises to ground potential the lower plate of capacitor 34. The upper plate of capacitor 34 follows this change in potential, rising above ground potential, and making possible the rapid transfer of charge from capacitor 34 to the much larger capacitor 40. The pulse 50a which renders transistor 37 conductive, thereby causing said transfer of charge to capacitor 40, lasts until time $t_4$, when the next positive excursion in the output signal 30a from amplifier 30 begins. At that time transistor 37 again becomes nonconducting, the potential on both plates of capacitor 34 drops back down by the same amount by which it rose at time $t_3$, and the potential on the upper plate of said capacitor again starts to rise. If this next rise in potential is due to the scanning of another hole in the linen piece under inspection, then it will again be followed by an interval of charge transfer to capacitor 40. On the other hand, if this next rise is due to the fact that the scanning path has reached the edge of the piece being scanned, which is the case in FIGURE 3(d), the next thing that happens is that capacitor 34 is again discharged and the potential on its upper plate established at V⁻ at the time of occurrence of the timing pulse in Scan #2.

It will be observed at Scan #2, FIGURE 3(a), that the output signal 20a remains above the bias value H during scan of the stain between $t_6$ and $t_7$. The multivibrator 49 accordingly does not flip at this time, since it is responsive only to the output of amplifier 30.

In this way, only charge accumulated on capacitor 34 due to scanning of holes will be transferred to and stored in final storage capacitor 40. Charge accumulated on capacitor 34 due to scanning of portions of belt 10 in which the absence of linen is not due to the presence of such holes will not be transferred to capacitor 40 and will not contribute to the indication of total hole area.

A pulse 51a derived from pulse generating circuit 51 energizes relay winding 42 immediately after a given piece of linen has passed completely across scanning path 23 of FIGURE 1, thereby closing switch 41 and discharging capacitor 40. This places capacitor 40 in readiness to store charge, and develop a potential representative of the total hole area in the next piece of linen to be transported across said scanning path.

It should be noted that the action of capacitors 34 and 40, each in combination with the resistor through which it receives its charge, can also be regarded as one of integration, capacitor 34 and resistor 33 cooperating to integrate positive-going portions of the output signal from amplifier 30 which are due to scanning of holes, and capacitor 40 and resistor 39 cooperating to integrate potentials above ground developed on the upper plate of capacitor 34.

The manner of generating the various pulses which control the operation of transistors 36 and 37 and switch 41 will now be described.

As has been indicated before, the pulse 48a which renders transistor 36 conductive is produced at the output terminal 48 of multivibrator 49. This multivibrator may be a bi-stable multivibrator circuit of any conventional form having two input terminals 52 and 53, and two output terminals 48 and 54, and capable of alternating between two states. In state (1) the output potential at terminal 48 is more positive than that at terminal 54, while in state (2) the opposite is true. Whenever state (2) exists, a positive-going transition in the input signal applied to terminal 52 causes a transition to state (1), while a positive-going transition in the input signal to terminal 53 causes no change. The situation is reversed when state (1) exists. In neither state does a negative-going transition in either input signal have any effect on either output potential.

The output signal produced at terminal 48 during the four typical scans under consideration is shown in FIGURE 3(e). This signal has a first positive-going transition at the time of occurrence of the timing pulse in Scan #1 (see FIGURE 3(b)). The positive output pulse from terminal 48 initiated by this transition is the pulse which renders transistor 36 conductive. Since only positive-going input signal transitions have any effect on the multivibrator output, this output is unaffected by the negative-going transition of the output signal from amplifier 30—which is the input signal applied to multivibrator input terminal 53—which occurs at time $t_1$ when the scanning path first crosses the edge of the linen piece under inspection. On the other hand, the positive-going transition in the input signal to terminal 53, which occurs at time $t_2$, when scanning of the hole in the piece under inspection commences, brings to an end the positive pulse which had been keeping transistor 36 conductive, and also ends the effectiveness of this transistor in preventing the potential on the upper plate of capacitor 34 from rising. As a result, during the time interval $t_2$–$t_3$ the potential on said upper plate of capacitor 34 is free to rise as shown in FIGURE 3(d), under the influence of the output signal from amplifier 30 which is positive due to scanning of a hole during said interval.

The next positive-going transition in the input signal applied to terminal 52 of multivibrator 49 is the timing pulse which occurs during Scan #2 (see FIGURE 3(b)). This timing pulse again causes the output signal produced at terminal 48 to go positive, thereby again rendering transistor 36 conductive, discharging capacitor 34 and lowering the potential on its upper plate to V⁻. As shown in FIGURE 3(d) by the rising potential waveform commencing at time $t_4$, this potential will have risen above V⁻ due to charge storage in capacitor 34 during the interval between the time $t_4$ when the scanning path of Scan #1 left the edge of the linen piece under inspection and the time when the timing pulse of Scan #2 occurred. The reason for this rise is that, during the foregoing interval, the output signal from photocell 20 of FIGURE 1 is indistinguishable from that produced by a hole in a linen piece under inspection. The charge (and potential) so accumulated must be, and in fact is removed by the discharging pulse initiated by the timing pulse in Scan #2, so that it does not contribute improperly to the hole-representative charge ultimately stored in capacitor 40.

During Scan #2, no hole is traversed. Therefore the next positive-going input to multivibrator terminal 53 does not occur until time $t_8$, when the scanning trace again leaves the edge of the piece being inspected, and it is not until that time that the positive output pulse from multivibrator terminal 48 ends.

During Scan #3, the output from terminal 48 again goes positive at the time of the timing pulse, but, since no linen at all is present in the scanning path, this output does not stop being positive during Scan #3, but stays at its positive value throughout that scan, and indeed until the next scan in which a piece of linen is present in the scanning path. This scan-to-scan persistence of the positive output from multivibrator terminal 48 therefore indicates scanning of the space between successive linen pieces. As explained hereinafter, this indication is utilized to bring to an end the accumulation, in storage capacitor 40, of the charge which represents the total hole area in a given piece, and also to ready said capacitor 40 for storage of the charge representing the total hole area in the next piece to be inspected.

As has been indicated previously, the charge accumulated on capacitor 34 during each scan of a hole is transferred immediately thereafter to capacitor 40, due to conduction of transistor 37 under control of a suitable pulse from AND circuit 50. The manner in which this pulse is produced will now be described.

AND circuit 50 is a conventional circuit which produces an output pulse when, and only when, both of the input signals supplied to it are simultaneously positive. Circuits suitable for use as AND circuit 50 are shown, for example, in "Pulse and Digital Circuits" by Millman and Taub, published 1956 by McGraw-Hill Book Company, Inc., New York, N.Y., in FIGURES 13–10 and 13–11 on page 400. One of the input signals to AND circuit 50 is the output signal 54a from terminal 54 of multivibrator 49. This signal is illustrated in FIGURE 3(f). The second input signal to AND circuit 50 is the output signal 55a from inverter circuit 55 of FIGURE 2, which may be of any conventional form capable of inverting the polarity of the signal supplied to its input. The latter signal is the output signal from amplifier 30. The second input signal to AND circuit 50 therefore has the form illustrated in FIGURE 3(g). From a comparison of FIGURES 3(f) and 3(g) it will be apparent that the two input signals to AND circuit 50 are both positive only during the time interval $t_3$–$t_4$, i.e. during the interval immediately following scanning of a hole. This, therefore, is the period during which an output pulse 50a is produced by AND circuit 50, by means of which transistor 37 is rendered conductive and transfer of charge to capacitor 40 is accomplished.

Energization of relay winding 42, and consequent closure of switch 41 and discharge of capacitor 40, occurs shortly after the end of any one scan during which no linen at all is scanned, i.e. following the end of inspection of a given piece of linen. As previously indicated, this energization is accomplished by the output signal 51a from pulse generator 51. The manner in which this output signal is produced will now be explained.

Pulse generator 51 may be a conventional, monostable multivibrator circuit, characterized by the fact that it produces an output pulse of given duration in response to each transition of its input signal 56a in a given direction (e.g. positive). The input signal 56a to pulse generator 51 is the output signal from AND circuit 56. This circuit may be identical to AND circuit 50, being productive of a positive output pulse when, and only when, both input signals are simultaneously positive. One input signal to AND circuit 56 is the series of timing pulses shown in FIGURE 3(b) which are produced by photocell 25 in FIGURE 1. The other input signal 57a to AND circuit 56 is the output signal from terminal 48 of multivibrator 49, time-delayed in delay circuit 57. This delay circuit may be any conventional form of delay line, capable of delaying the output signal from mutivibrator terminal 48 by a time interval slightly longer than the duration of any one of the timing pulses from photocell 25. The output signal produced by delay circuit 57 is shown in FIGURE 3(h). From a comparison of FIGURES 3(b) and 3(h), showing the two input signals to AND circuit 56, respectively, it will be recognized that, during scans in which linen is traversed by the scanning path, any positive output pulses from delay circuit 57 will begin after the end of the timing pulse produced during the same scan, and will end before the beginning of the timing pulse produced during the next succeeding scan. Therefore, during scans in which linen is traversed, there will be no interval during which both of these input signals are positive, and therefore no output from AND circuit 56 capable of triggering pulse generator 51. On the other hand, during Scan #3, during which no linen is traversed, the delay line output signal shown in FIGURE 3(h) will remain positive throughout that scan and on into Scan #4 until at least after the occurrence of the timing pulse in said next succeeding scan. Therefore both input signals to AND circuits 56 will be positive during the timing pulse period of Scan #4, AND circuit 56 will produce an output pulse 56a at that time, and pulse generator 51 will respond to this pulse to energize relay winding 42, thereby closing switch 42 and discharging capacitor 40.

Since Scan #3 represents the first scan following inspection of an entire linen piece, the discharge of capacitor 40 occurs one scan after the end of each piece. Thus the charge on capacitor 40 accumulates to indicate the total hole area of each piece being inspected and is discharged during the interval between any two successively inspected pieces.

Circuitry similar to that employed to generate the control pulses for intermediate storage circuit 38 is employed to control the operation of intermediate storage circuit 45. More particularly, this circuitry comprises a multivibrator 49' similar to multivibrator 49, an inverter 55' similar to inverter 55 and an AND circuit 50' similar to circuit 50. The input connections to and interconnections between components 49', 55' and 50' are also the same as those of components 49, 55 and 50, except that the output signal from amplifier 31 is substituted for that from amplifier 30. The output signals from output terminal 48' of multivibrator 49' (corresponding to terminal 48 of multivibrator 49) are applied to the base of transistor 58 shunting the series combination of capacitor 59 and resistor 60 in circuit 45. The output signal from AND circuit 50' is applied to the base of transistor 61 shunting capacitor 59 of circuit 45.

By an analysis similar to that carried out for components 49, 55 and 50 it can be shown that components 49', 55' and 50' cooperate to control the conduction of transistors 58 and 61 in such a way as to make possible the transfer of charge from capacitor 59 to capacitor 62 of final storage 46 following each interval of scanning either a hole, or a stain sufficiently dark to produce a positive output from amplifier 31. However, gating circuit 32 eliminates all the positive output signals from amplifier 31 except those due to said stains. Therefore, only during scanning of stains will any charge be accumulated on capacitor 59 and only after scanning of stains will any such charge be transferred to capacitor 62. The charge accumulated on, and the potential developed across capacitor 62 therefore represents the total area of stains scanned between successive discharges of capacitor 62. These discharges occur once at the end of each scanning of an entire piece of linen by closing of switch 63 in response to energization of relay winding 64 by the same output signal which energizes winding 42.

Signal utilization means 47 may be of the same form as means 44, being responsive to the development of a potential across capacitor 62 in excess of a preset value to affect the disposition of the piece of linen whose scanning has produced this potential.

It will be understood that many modifications of the above apparatus are possible without departing from the inventive concept. For example, the polarities of the various signals discussed above can be changed, provided the consistency between them necessary to yield the desired cooperation is maintained. Transistors can be used in place of the storage capacitor charging resistors in FIGURE 2 in order to improve the linearity of the charging process. Means other than photocell 25, e.g. a microswitch sensing mechanically the rotation of mirror 17, can be used to generate the timing pulses of FIGURE 3(b), and so forth. Therefore the scope of the inventive concept is to be regarded as limited only by the appended claims.

We claim:

1. An inspection apparatus comprising: means for recurrently scanning an inspection path having a given background reflectivity and having a portion adapted to be occupied by material whose reflectivity differs from said background reflectivity; means responsive to said scanning to produce an electrical signal having a first value in response to said background reflectivity and a distinctively different second value in response to said material reflectivity; storage means responsive to the application of a signal having said first value to store electrical charge in an amount representing the duration of said application; means for producing an electrical pulse signal during each recurrent scanning of portions of said inspection path outside the said portion adapted to be occupied by material; and means for utilizing said pulse signal to disable said storage means during each period intermediate the occurrence of said pulse signal and the next following transition of said first mentioned signal from said second to said first value.

2. The apparatus of claim 1 further comprising a second electrical charge storage means, and means for transferring to said second storage means any charge stored in said first-mentioned charge storage means during the interval between said transition next following said pulse signal and the next following transition of said first-mentioned signal from said first to said second value.

3. The apparatus of claim 2 further comprising means responsive to two consecutive occurrences of said pulse signal without the intervening occurrence of a transition in said first-mentioned signal from said first to said second value to discharge said second charge storage means.

4. The apparatus of claim 3 characterized in that said signal producing means comprises means for developing a signal which is subject to variations above and below a threshold value, and means responsive to the attainment by said developed signal of values above said threshold to produce a signal of said first value and to attainment by said developed signal of values below said threshold to produce a signal of said second value.

5. The apparatus of claim 4 comprising means for varying said threshold value.

6. The apparatus of claim 5 further comprising means for transporting said material across said scanning path, said transporting means having a reflectivity such that said signal derived from said transporting means is on the other side of said threshold from said signal derived from material having the highest reflectivity, and means for deriving from said developed signal an additional signal having alternations between a first and second value in response to attainment by said developed signal of values respectively above and below a second threshold value, said second threshold value being nearer to that corresponding to said highest material reflectivity than said first-mentioned threshold value.

7. The apparatus of claim 6 further comprising means responsive to the application of said additional signal to store electrical charge in an amount representing the duration of periods during which said additional signal has said second value, and means for preventing said application of said additional signal to said last-named storage means during periods during which said first-mentioned alternating signal has said first value.

8. The apparatus of claim 7 further comprising an additional charge storage means and means for transferring to said additional storage means any charge stored in said storage means which is responsive to said additional signal.

9. The apparatus of claim 8 further characterized in that said means for discharging said second storage means is also operative to discharge simultaneously said additional storage means.

10. The apparatus of claim 9 further comprising means responsive to the accumulation of charge in excess of a predetermined value on at least one of said second and additional charge means to produce a perceptible indication.

11. An inspecting apparatus having means defining a background surface and adapted to inspect material having a first normal reflectivity value and a second abnormal reflectivity value, each differing from the reflectivity of the background surface including: means effective to scan successive areas of said material; means effective to produce signals instantaneously responsive to light reflected from said material during the course of a single scan; first storage means effective to integrate said signals during a single scan to the extent they are a response to said abnormal reflectivity; second storage means effective to integrate the signals from said first storage means over a plurality of scans; and means operative in response to a completion of a scan having at least a portion of its travel with said normal reflectivity to transfer signals from said first storage means to said second storage means and in response to a scan without at least a portion of its travel with said normal reflectivity to discharge said second storage means.

12. An inspecting apparatus having means defining a background surface and adapted to inspect material having a first normal reflectivity value and a second abnormal reflectivity value, each differing from the reflectivity of the background surface including: means effective to scan successive areas of said material; means effective to produce voltage signals responsive to light reflected from said material during the course of a single scan; first capacitor storage means effective to integrate said signals during a single scan to the extent that they are a response to said abnormal reflectivity; second capacitor storage means having greater capacity than said first storage means effective to integrate the signals from said first capacitor storage means over a plurality of scans; and means operative in response to a scan without at least a portion of its travel with said normal reflectivity to discharge said second storage means.

13. An inspecting apparatus having means defining a background surface and adapted to inspect material having a first normal reflectivity value and a second abnormal reflectivity value, each differing from the reflectivity of the background surface including: means effective to scan successive areas of said material; means effective to produce signals instantaneously responsive to light reflected from said material during the course of a single scan; first storage means effective to integrate said signals during a single scan to the extent they are a responsive to said abnormal reflectivity; second storage means effective to integrate said signals from the first storage means over a plurality of scans defined by the number of scans necessary to inspect a single piece of material; and means operative in response to completion of a scan having at least a portion of its travel with said normal reflectivity to transfer the signal from said first storage means to said second storage means.

14. An inspecting apparatus having means defining a background surface and adapted to inspect material having a first normal reflectivity value and a second abnormal reflectivity value, each differing from the reflectivity of the background surface including: means effective to scan successive areas of said material; means effective to produce signals responsive to light reflected from said material during the course of a single scan; first storage means effective to integrate said signals during a single scan to the extent that said signals are a response to said abnormal reflectivity; second storage means effective to integrate the signals from said first storage means over a plurality of scans; and means operative in response to a scan without at least a portion of its travel with said normal reflectivity to discharge said second storage means.

15. An inspecting apparatus having means defining a background surface and adapted to inspect material having a first normal reflectivity value and a second abnormal reflectivity value, each differing from the reflectivity of the background surface including: conveyor means effective to move said material along a predetermined path in said inspecting apparatus; means effective to scan successive areas of said material as it is moved along under said means by the conveyor; means effective to produce signals instantaneously responsive to light reflected from said material during the course of a single scan; first storage means effective to integrate said signals during a single scan, during a scan of a surface having abnormal reflectivity; second storage means effective to integrate the signals from said first storage means over a plurality of scans; and means operative in response to a completion of a scan having at least a portion of its travel with said normal reflectivity to transfer signals from said first storage means to said second storage means and in response to a scan without at least a portion of its travel with said normal reflectivity to discharge said second storage means.

16. An inspecting apparatus having means defining a background surface and adapted to inspect material having a first normal reflectivity value and a second abnormal reflectivity value, each differing from the reflectivity of the background surface including conveyor means effective to move said material along a predetermined path in said inspecting apparatus; means effective to scan successive areas of said material as it is moved along under said means by the conveyor; means effective to produce signals instantaneously responsive to light reflected from said material during the course of a single scan; first capacitor storage means effective to integrate signals responsive only to reflections from said abnormal reflective surface; second capacitor storage means effective to integrate said signals from the first storage means over a plurality of scans defined by the number of scans necessary to inspect a single piece of material; and means operative in response to completion of a scan having at least a portion of its travel with said normal reflectivity to transfer the signal from said first storage means to said second storage means.

17. An inspection system for discrete pieces of material having predetermined spacings defining successive gaps and having a first normal reflectivity value and second abnormal reflectivity value, said abnormal reflectivity value due to imperfections in the pieces of material in the form of holes and stains, said system including: conveyor means effective to move said pieces along a predetermined path and to receive said pieces in spaced relation along said path, said pieces having varying orientations and edge shapes; means effective to scan successive areas of said pieces of material in a path of scan as they pass beneath said scan means on said conveyor means, said path of scan being a substantially straight line with a substantial deviation from the normal to said predetermined path, the deviation of said path of scan from the normal being such that at least one scan can be made within the confines of each of said gaps; means effective to produce signals instantaneously responsive to light reflected from said material during the course of a single scan; first storage means effective to integrate said signals during a single scan to the extent that said signals are a response to said abnormal reflectivity; second storage means effective to integrate the signals from said first storage means over a plurality of scans; means operative in response to a completion of scan having at least a portion of its travel with said normal reflectivity to transfer signals from said first storage means to said second storage means and in response to a scan without at least a portion of its travel with said normal reflectivity to discharge said second storage means; and elements responsive to the reflectivity of the conveyor means and pieces along the path of scan whereby irregular edges of varying orientations of the pieces with respect to the conveyor means will not affect the operation of the inspection system.

18. In an inspection apparatus for inspecting pieces of material characterized by a normal light reflectivity from satisfactory material areas and an abnormal light reflectivity due to imperfections in the form of holes and stains in said material, said apparatus comprising: means for transporting said pieces of material along a path through said apparatus; means for producing an electrical signal representing the light reflectivity of successive elemental areas in a recurrently scanned path over said material as it is moved along the path through said apparatus by said transporting means in the scanned path of said signal producing means; means responsive to scans of said abnormal light reflective area of the material to produce distinct electrical quantities, one said quantity representing the scanned area of holes in the material during each scan and the other quantity representing the scanned area of stains in said material during each scan; and means to integrate the total of said distinct electrical quantities from a plurality of scans including the entire piece of material.

19. Apparatus according to claim 18, further characterized in that said scan responsive means comprises means for illuminating said scanning path, photosensitive means responsive to light to produce an electrical signal, and means for projecting onto said photosensitive means light from successively scanned element areas of said illuminated scanning path, said projecting means comprising a rotating mirror receiving light reflected from said scanning path and reflecting said received light toward said photoelectric means and apertured means for limiting the light reaching said photoelectric means from said mirror to that emanating from one of said elemental areas at a time.

20. The apparatus of claim 18 characterized in that said scan responsive means comprises a pair of electrical charge storage means, and means for supplying charge to different ones of said charge storage means, respectively, in response to portions of said electriacl quantities respectively representing the light reflectivity of said stains and of said holes.

References Cited by the Examiner
UNITED STATES PATENTS

| | | | |
|---|---|---|---|
| 1,926,824 | 9/1933 | Stogoff | 250—236 X |
| 2,494,441 | 1/1950 | Hillier | 88—14 |
| 2,583,003 | 1/1952 | Mayle | 88—14 |
| 2,606,294 | 8/1952 | Hagan | 250—219 X |
| 2,674,916 | 4/1954 | Smith | 328—127 X |
| 2,753,464 | 7/1956 | Stone | 250—52 |
| 2,866,376 | 12/1958 | Cook | 250—219 |
| 2,881,255 | 4/1959 | Hall | 328—151 X |
| 2,966,594 | 12/1960 | Hinz et al. | 250—219 |
| 3,023,900 | 3/1962 | Thier | 250—236 X |
| 3,053,181 | 9/1962 | Jorgensen | 250—219 |
| 3,105,151 | 9/1963 | Nash | 250—219 |

RALPH G. NILSON, *Primary Examiner.*

E. STRICKLAND, M. A. LEAVITT,
*Assistant Examiners.*